US010894477B2

(12) United States Patent
Wang

(10) Patent No.: US 10,894,477 B2
(45) Date of Patent: *Jan. 19, 2021

(54) ELECTRIC VEHICLE AND VEHICLE-MOUNTED CHARGER, AND METHOD FOR CONTROLLING THE SAME

(71) Applicant: BYD COMPANY LIMITED, Shenzhen (CN)

(72) Inventor: Xinghui Wang, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 51 days.

This patent is subject to a terminal disclaimer.

(21) Appl. No.: 16/060,803

(22) PCT Filed: Dec. 16, 2016

(86) PCT No.: PCT/CN2016/110275
§ 371 (c)(1),
(2) Date: Jun. 8, 2018

(87) PCT Pub. No.: WO2017/101842
PCT Pub. Date: Jun. 22, 2017

(65) Prior Publication Data
US 2018/0370370 A1 Dec. 27, 2018

(30) Foreign Application Priority Data
Dec. 18, 2015 (CN) .......................... 2015 1 0956926

(51) Int. Cl.
B60L 53/22 (2019.01)
H02J 7/02 (2016.01)
(Continued)

(52) U.S. Cl.
CPC .......... *B60L 11/1812* (2013.01); *B60L 3/003* (2013.01); *B60L 53/00* (2019.02); *B60L 53/20* (2019.02);
(Continued)

(58) Field of Classification Search
CPC ...... B60L 11/1812; B60L 3/003; B60L 53/00; B60L 53/22; H02J 7/022; H02P 27/08
(Continued)

(56) References Cited

U.S. PATENT DOCUMENTS 5,287,051 A * 2/1994 Konrad ............. H02M 7/53875
318/803
5,486,748 A * 1/1996 Konrad ............. H02M 7/53875
318/811
(Continued)

FOREIGN PATENT DOCUMENTS

CN 101488722 A 7/2009
CN 101966819 A 2/2011
(Continued)

OTHER PUBLICATIONS

"Advantages of MOSFET | disadvantages of MOSFET," RFWirelessworld.com, Accessed Online Jan. 29, 2020, www.rfwireless-world.com/Terminology/Advantages-and-Disadvantages-of-MOSFET.html.*
(Continued)

Primary Examiner — John T Trischler
(74) Attorney, Agent, or Firm — Anova Law Group, PLLC

(57) ABSTRACT

A method is provided for controlling a vehicle-mounted charger. The method includes: obtaining a first total charging time for controlling the H bridge in a first manner, a second total charging time for controlling the H bridge in a second manner, a first total discharging time for controlling the H
(Continued)

bridge in the first manner and a second total discharging time for controlling the H bridge in the second manner; calculating a first total working time in the first manner and a second total working time in the second manner; and selecting a manner according to a relation between the first total working time and the second total working time to perform a temperature balanced control over the first to fourth switch transistor if the vehicle-mounted charger charges the power battery, or if the power battery discharges via the vehicle-mounted charger.

14 Claims, 10 Drawing Sheets

(51) Int. Cl.
| | | |
|---|---|---|
| *B60L 11/18* | (2006.01) | |
| *B60L 3/00* | (2019.01) | |
| *H02P 27/08* | (2006.01) | |
| *B60L 53/00* | (2019.01) | |
| *B60L 53/20* | (2019.01) | |

(52) U.S. Cl.
CPC ............... *B60L 53/22* (2019.02); *H02J 7/02* (2013.01); *H02J 7/022* (2013.01); *H02P 27/08* (2013.01); *B60L 2210/30* (2013.01); *B60L 2240/525* (2013.01); *H02J 2207/20* (2020.01); *Y02T 10/70* (2013.01); *Y02T 10/7072* (2013.01); *Y02T 10/72* (2013.01); *Y02T 90/12* (2013.01); *Y02T 90/14* (2013.01)

(58) Field of Classification Search
USPC .......................................................... 320/109
See application file for complete search history.

(56) References Cited

U.S. PATENT DOCUMENTS

| | | | | |
|---|---|---|---|---|
| 5,686,812 | A * | 11/1997 | Hotta | H02J 7/0031 320/134 |
| 6,919,693 | B2 * | 7/2005 | Fushimi | H05B 41/2822 315/219 |
| 7,043,377 | B2 * | 5/2006 | Shiraishi | H02M 7/48 702/57 |
| 7,176,658 | B2 * | 2/2007 | Quazi | H02M 7/2176 322/24 |
| 7,880,337 | B2 * | 2/2011 | Farkas | B60L 58/40 307/104 |
| 8,222,862 | B2 * | 7/2012 | Ichikawa | B60L 58/20 320/116 |
| 8,362,643 | B2 * | 1/2013 | Luo | H02J 3/32 307/46 |
| 8,423,218 | B2 * | 4/2013 | Koide | B60K 6/46 701/22 |
| 8,432,715 | B2 * | 4/2013 | Fukuta | H02M 1/36 363/132 |
| 8,487,922 | B2 * | 7/2013 | Brown | G09G 3/3688 307/108 |
| 8,610,400 | B2 * | 12/2013 | Stevens | H04B 5/0037 320/108 |
| 8,751,085 | B2 * | 6/2014 | Major | G06F 17/00 701/22 |
| 8,786,227 | B2 * | 7/2014 | Kubo | B60H 1/3213 310/16 |
| 8,810,060 | B2 * | 8/2014 | Kamaga | B60L 50/61 307/9.1 |
| 8,862,414 | B2 * | 10/2014 | LePort | H01M 10/486 340/438 |
| 8,884,562 | B1 * | 11/2014 | Cameron, Jr. | H02P 6/10 318/400.29 |
| 9,056,207 | B2 * | 6/2015 | Shao | A61N 1/3912 |
| 9,174,540 | B2 * | 11/2015 | Kwak | B60H 1/00385 |
| 9,178,379 | B2 * | 11/2015 | Choi | B60L 53/305 |
| 9,240,703 | B2 * | 1/2016 | Jang | H02J 7/04 |
| 9,263,960 | B2 * | 2/2016 | Jovanovi | H02M 1/10 |
| 9,276,426 | B2 * | 3/2016 | Kim | H02J 7/0055 |
| 9,304,969 | B2 * | 4/2016 | Doi | G01R 31/367 |
| 9,428,173 | B2 * | 8/2016 | Stefanon | B60W 10/26 |
| 9,455,641 | B2 * | 9/2016 | Kondo | H02M 3/33584 |
| 9,484,836 | B2 * | 11/2016 | Watanabe | H02M 7/483 |
| 9,583,956 | B2 * | 2/2017 | Wang | B60L 53/65 |
| 9,623,761 | B2 * | 4/2017 | Gale | B60L 3/04 |
| 9,667,159 | B2 * | 5/2017 | Akamatsu | H02M 7/4807 |
| 9,667,171 | B2 * | 5/2017 | Hara | H02M 3/3376 |
| 9,742,289 | B2 * | 8/2017 | Hayakawa | H02M 3/33507 |
| 9,776,518 | B2 * | 10/2017 | Weissenborn | H02J 7/0003 |
| 9,806,634 | B2 * | 10/2017 | Kano | B60L 7/14 |
| 9,837,918 | B2 * | 12/2017 | Ye | H02M 3/33569 |
| 9,866,155 | B2 * | 1/2018 | Sugawara | B62D 5/0469 |
| 9,871,395 | B2 * | 1/2018 | Yoshida | H02J 7/0029 |
| 9,931,951 | B2 * | 4/2018 | Khaligh | B60L 11/1812 |
| 9,998,111 | B2 * | 6/2018 | Ngo | H03K 17/122 |
| 10,086,711 | B2 * | 10/2018 | Kawamura | B60L 53/22 |
| 10,224,826 | B2 * | 3/2019 | Iyasu | H02M 3/33576 |
| 10,411,608 | B2 * | 9/2019 | Ye | H02M 3/33569 |
| 10,483,882 | B2 * | 11/2019 | Ashida | B60L 3/0038 |
| 10,498,252 | B2 * | 12/2019 | Wang | H02M 7/219 |
| 10,566,821 | B2 * | 2/2020 | Wang | H02J 7/02 |
| 10,618,416 | B2 * | 4/2020 | Wang | B60L 11/1812 |
| 10,625,616 | B2 * | 4/2020 | Wang | B60L 11/1851 |
| 10,675,978 | B2 * | 6/2020 | Wang | B60L 53/22 |
| 2001/0015904 | A1 * | 8/2001 | Kimura | H02M 7/538 363/131 |
| 2002/0075698 | A1 * | 6/2002 | Kuranuki | H02M 1/34 363/17 |
| 2004/0212319 | A1 * | 10/2004 | Fushimi | H05B 41/2822 315/276 |
| 2005/0146308 | A1 * | 7/2005 | Quazi | H02M 7/2176 322/28 |
| 2008/0265684 | A1 * | 10/2008 | Farkas | B60L 58/40 307/104 |
| 2009/0039831 | A1 * | 2/2009 | Ichikawa | B60L 58/20 320/118 |
| 2010/0134053 | A1 * | 6/2010 | Yamada | H02M 7/53875 318/162 |
| 2010/0270860 | A1 * | 10/2010 | Kamaga | B60L 1/14 307/10.7 |
| 2011/0074755 | A1 * | 3/2011 | Brown | G09G 3/3688 345/211 |
| 2011/0080149 | A1 * | 4/2011 | Fukuta | H02M 1/36 323/284 |
| 2011/0137503 | A1 * | 6/2011 | Koide | B60K 6/46 701/22 |
| 2011/0163542 | A1 * | 7/2011 | Farkas | B60L 58/40 290/2 |
| 2011/0285214 | A1 * | 11/2011 | Stevens | H02J 50/10 307/104 |
| 2012/0001575 | A1 * | 1/2012 | Kubo | B60H 1/3213 318/400.17 |
| 2012/0161925 | A1 * | 6/2012 | Gale | B60L 53/65 340/5.28 |
| 2013/0057075 | A1 * | 3/2013 | Kim | H02J 7/00 307/72 |
| 2013/0073229 | A1 * | 3/2013 | LePort | H01M 10/486 702/58 |
| 2013/0134941 | A1 * | 5/2013 | Jang | H02J 7/04 320/116 |
| 2013/0151087 | A1 * | 6/2013 | Doi | H02J 7/007 701/50 |
| 2014/0002022 | A1 * | 1/2014 | Choi | H02J 7/027 320/109 |
| 2014/0039735 | A1 * | 2/2014 | Major | G06F 17/00 701/22 |
| 2014/0062368 | A1 * | 3/2014 | Roessler | B60L 3/003 318/454 |
| 2014/0159661 | A1 * | 6/2014 | Weissenborn | H02J 7/0003 320/109 |

(56) References Cited

U.S. PATENT DOCUMENTS

| | | | | |
|---|---|---|---|---|
| 2014/0177281 A1* | 6/2014 | Lai | H02M 3/3353 | 363/17 |
| 2014/0292261 A1* | 10/2014 | Wang | B60L 3/12 | 320/107 |
| 2015/0006017 A1* | 1/2015 | Kwak | B60H 1/00385 | 701/29.2 |
| 2015/0015181 A1* | 1/2015 | Kondo | H02M 3/33584 | 320/103 |
| 2015/0042159 A1* | 2/2015 | Kim | B60L 53/20 | 307/10.1 |
| 2015/0042166 A1* | 2/2015 | Fujita | H02M 11/00 | 307/63 |
| 2015/0120104 A1* | 4/2015 | Stefanon | B60L 50/16 | 701/22 |
| 2015/0256105 A1* | 9/2015 | Kano | B60L 7/14 | 307/10.1 |
| 2015/0263646 A1* | 9/2015 | Hara | B60L 53/36 | 363/17 |
| 2016/0016479 A1* | 1/2016 | Khaligh | B60L 11/1812 | 363/17 |
| 2016/0099560 A1* | 4/2016 | Yamada | H02H 5/044 | 361/103 |
| 2016/0105119 A1* | 4/2016 | Akamatsu | H02M 3/33546 | 363/21.04 |
| 2016/0303987 A1* | 10/2016 | Kawamura | B60L 53/22 | |
| 2016/0352107 A1* | 12/2016 | Yoshida | H02J 7/007 | |
| 2016/0380527 A1* | 12/2016 | Hayakawa | H02M 3/33507 | 363/21.12 |
| 2017/0025867 A1* | 1/2017 | Wang | H02J 7/0019 | |
| 2017/0179944 A1* | 6/2017 | Ngo | H03K 17/122 | |
| 2017/0264123 A1* | 9/2017 | Mulawski | H02J 7/0021 | |
| 2018/0062542 A1* | 3/2018 | Sakakibara | H02M 7/53873 | |
| 2018/0102715 A1* | 4/2018 | Takahashi | H02M 7/48 | |
| 2018/0222333 A1* | 8/2018 | Khaligh | B60L 11/1812 | |
| 2018/0278069 A1* | 9/2018 | Zhang | H02J 7/00 | |
| 2018/0319285 A1* | 11/2018 | Wang | B60L 3/003 | |
| 2018/0361860 A1* | 12/2018 | Wang | B60L 53/14 | |
| 2018/0370381 A1* | 12/2018 | Wang | H02M 7/5395 | |
| 2018/0375366 A1* | 12/2018 | Wang | H02M 7/797 | |
| 2018/0375439 A1* | 12/2018 | Wang | H02J 7/022 | |
| 2019/0020216 A1* | 1/2019 | Wang | H02M 7/162 | |
| 2019/0089275 A1* | 3/2019 | Ashida | B60L 50/50 | |
| 2020/0021102 A1* | 1/2020 | Kim | H02H 1/0007 | |

FOREIGN PATENT DOCUMENTS

| | | |
|---|---|---|
| CN | 102117943 A | 7/2011 |
| CN | 102611348 A | 7/2012 |
| CN | 202443498 U | 9/2012 |
| CN | 103941772 A | 7/2014 |
| CN | 104600998 A | 5/2015 |
| CN | 204835609 U | 12/2015 |
| JP | H08116604 A | 5/1996 |
| JP | 2012120394 A | 6/2012 |
| JP | 2013046445 A | 3/2013 |
| JP | 2013116042 A | 6/2013 |

OTHER PUBLICATIONS

The World Intellectual Property Organization (WIPO) International Search Report and Written Opinion for PCT/CN2016/110275 dated Mar. 22, 2017 7 Pages.

* cited by examiner ion No. PCT/CN2016/110275, filed on Dec. 16, 2016, which is based on and claims priority to Chinese Patent Application Serial No. 201510956926.2, filed on Dec. 18, 2015, all content of all of which is hereby incorporated by reference in its entity.

ELECTRIC VEHICLE AND VEHICLE-MOUNTED CHARGER, AND METHOD FOR CONTROLLING THE SAME

CROSS-REFERENCE TO RELATED APPLICATION

The present application is a national phase entry under 35 U.S.C. § 371 of International Application No. PCT/CN2016/110275, filed on Dec. 16, 2016, which is based on and claims priority to Chinese Patent Application Serial No. 201510956926.2, filed on Dec. 18, 2015, all content of all of which is hereby incorporated by reference in its entity.

FIELD

The present disclosure relates to the technical field of electric vehicles, in particular to a method for controlling a vehicle-mounted charger of an electric vehicle, a vehicle-mounted charger of an electric vehicle, and an electric vehicle.

BACKGROUND

Along with the commercialization progress of electric vehicles, a vehicle-mounted charger of the electric vehicles has become one of important components in the electric vehicles.

There are many methods for charging the whole vehicle and for discharging outwards from the whole vehicle via the vehicle-mounted charger. A monophase H bridge control method is mostly adopted in related arts, which includes a dual-polarity control method and a mono-polarity control method.

However, when the dual-polarity control method is adopted, 4 switch tubes in an H bridge are all in a high frequency ON/OFF state, resulting in higher switching loss and larger heat loss; when the mono-polarity control method is adopted, although the heat loss of the switch tubes that is generated when the dual-polarity control method is adopted can be solved to some extent, the four switch tubes in the H bridge are controlled according to a fixing manner during a charging process or a discharging process of the whole vehicle, some switch tubes in the H bridge need to be switched off with current, so that the overheat problem of the switch tubes switched off with current is not effectively solved.

Therefore, no matter the dual-polarity control method or the mono-polarity control method is adopted, the heating problem of the switch tubes in the H bridge cannot be effectively solved, and the service life of the switch tubes is affected.

SUMMARY

The present disclosure aims to solve at least one of the technical problems in the related art to some extent. For this purpose, a first objective of the present disclosure is to provide a method for controlling a vehicle-mounted charger of an electric vehicle, which is capable of enabling heating of a first switch tube, a second switch tube, a third switch tube and a fourth switch tube in an H bridge to be relatively balanced, and improving a service life of the switch tubes in the H bridge.

A second objective of the present disclosure is to provide a vehicle-mounted charger of an electric vehicle. A third objective of the present disclosure is to provide an electric vehicle.

For the above purpose, in one aspect of embodiments of the present disclosure, there is provided a method for controlling a vehicle-mounted charger of an electric vehicle. The vehicle-mounted charger includes an H bridge. The H bridge includes a first switch tube, a second switch tube, a third switch tube and a fourth switch tube. The method includes: obtaining a first total charging period for controlling the H bridge in a first manner, a second total charging period for controlling the H bridge in a second manner, a first total discharging period for controlling the H bridge in the first manner and a second total discharging period for controlling the H bridge in the second manner; calculating a first total working period of the H bridge in the first manner according to the first total charging period and the first total discharging period, and calculating a second total working period of the H bridge in the second manner according to the second total charging period and the second total discharging period; and selecting a manner for controlling the H bridge according to a relation between the first total working period and the second total working period to perform a temperature balanced control over the first switch tube, the second switch tube, the third switch tube and the fourth switch tube if the vehicle-mounted charger charges the power battery, or if the power battery discharges via the vehicle-mounted charger.

According to the method for controlling a vehicle-mounted charger of an electric vehicle in embodiments of the present disclosure, the first total working period of the H bridge in the first manner is calculated according to the obtained first total charging period and the obtained first total discharging period, and the second total working period of the H bridge in the second manner is calculated according to the obtained second total charging period and the obtained second total discharging period, and then the manner for controlling the H bridge is selected according to the relation between the first total working period and the second total working period to perform the temperature balanced control over the first switch tube, the second switch tube, the third switch tube and the fourth switch tube if the vehicle-mounted charger charges the power battery, or if the power battery discharges via the vehicle-mounted charger, such that the heating of each switch tube is relatively balanced, the service life of the switch tubes in the H bridge is prolonged, and thus the service period is prolonged.

For the above purpose, in another aspect of embodiments of the present disclosure, there is provided a vehicle-mounted charger of an electric vehicle, including: an H bridge, including a first switch tube, a second switch tube, a third switch tube and a fourth switch tube; and a controller, configured to obtain a first total charging period for controlling the H bridge in a first manner, a second total charging period for controlling the H bridge in a second manner, a first total discharging period for controlling the H bridge in the first manner and a second total discharging period for controlling the H bridge in the second manner; to calculate a first total working period of the H bridge in the first manner according to the first total charging period and the first total discharging period and to calculate a second total working period of the H bridge in the second manner according to the second total charging period and the second total discharging period; and to select a manner for controlling the H bridge according to a relation between the first total working period and the second total working period to perform a temperature balanced control over the first switch tube, the second switch tube, the third switch tube and the fourth switch tube if the vehicle-mounted charger charges the power battery or if the power battery discharges via the vehicle-mounted charger.

According to the vehicle-mounted charger of an electric vehicle in embodiments of the present disclosure, the controller calculates the first total working period of the H bridge in the first manner according to the obtained first total charging period and the obtained first total discharging period, and the second total working period of the H bridge in the second manner according to the obtained second total charging period and the obtained second total discharging period, and then selects the manner of controlling the H bridge according to the relation between the first total working period and the second total working period to perform the temperature balanced control over the first switch tube, the second switch tube, the third switch tube and the fourth switch tube if the vehicle-mounted charger charges the power battery, or if the power battery discharges via the vehicle-mounted charger, such that the heating of each switch tube is relatively balanced, the service life of the switch tubes in the H bridge is prolonged, and thus the service period is prolonged.

In addition, an embodiment of the present disclosure also provides an electric vehicle, including the vehicle-mounted charger of an electric vehicle.

According to the electric vehicle in embodiments of the present disclosure, when the power battery is charged and discharged by the above vehicle-mounted charger, the temperature balanced control over the first switch tube, the second switch tube, the third switch tube and the fourth switch tube in the H bridge can be realized, such that the heating of each switch tube is balanced, the service life of the switch tubes in the H bridge is prolonged, and thus the service period of the vehicle-mounted charger is prolonged.

DETAILED DESCRIPTION

Figure 1:
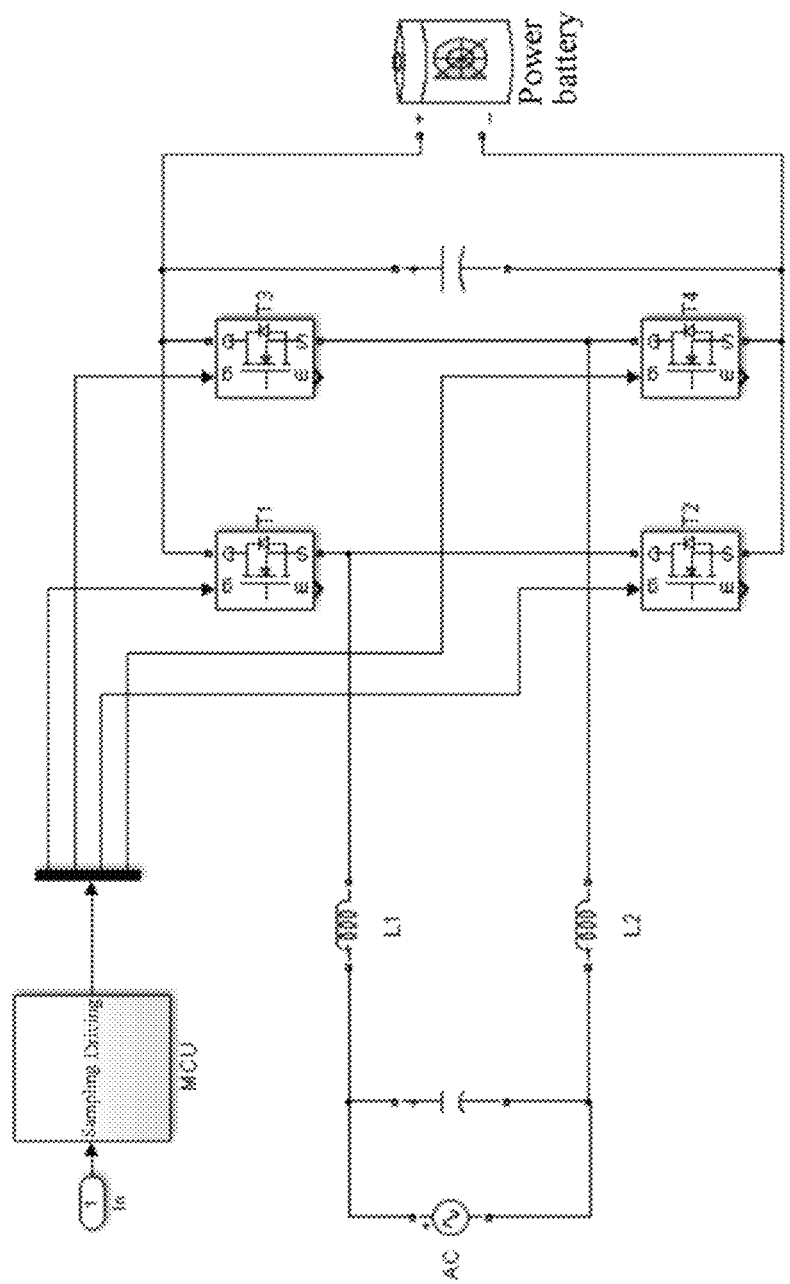
FIG. 1 is a circuit schematic diagram of a vehicle-mounted charger of an electric vehicle of an embodiment of the present disclosure.

The embodiments of the present disclosure are described in detail, examples of the embodiments are shown in the drawings, wherein, the same or similar numbers represent same or similar elements or elements having the same or similar functions from beginning to end. The embodiments described with reference to the drawings are exemplary, and aim to explain the present disclosure rather than understood as a limitation to the present disclosure.

The method for controlling a vehicle-mounted charger of an electric vehicle, a vehicle-mounted charger of an electric vehicle, and an electric vehicle with the vehicle-mounted charger, provided in embodiments of the present disclosure, are described with reference to the drawings as follows.

Figure 2:
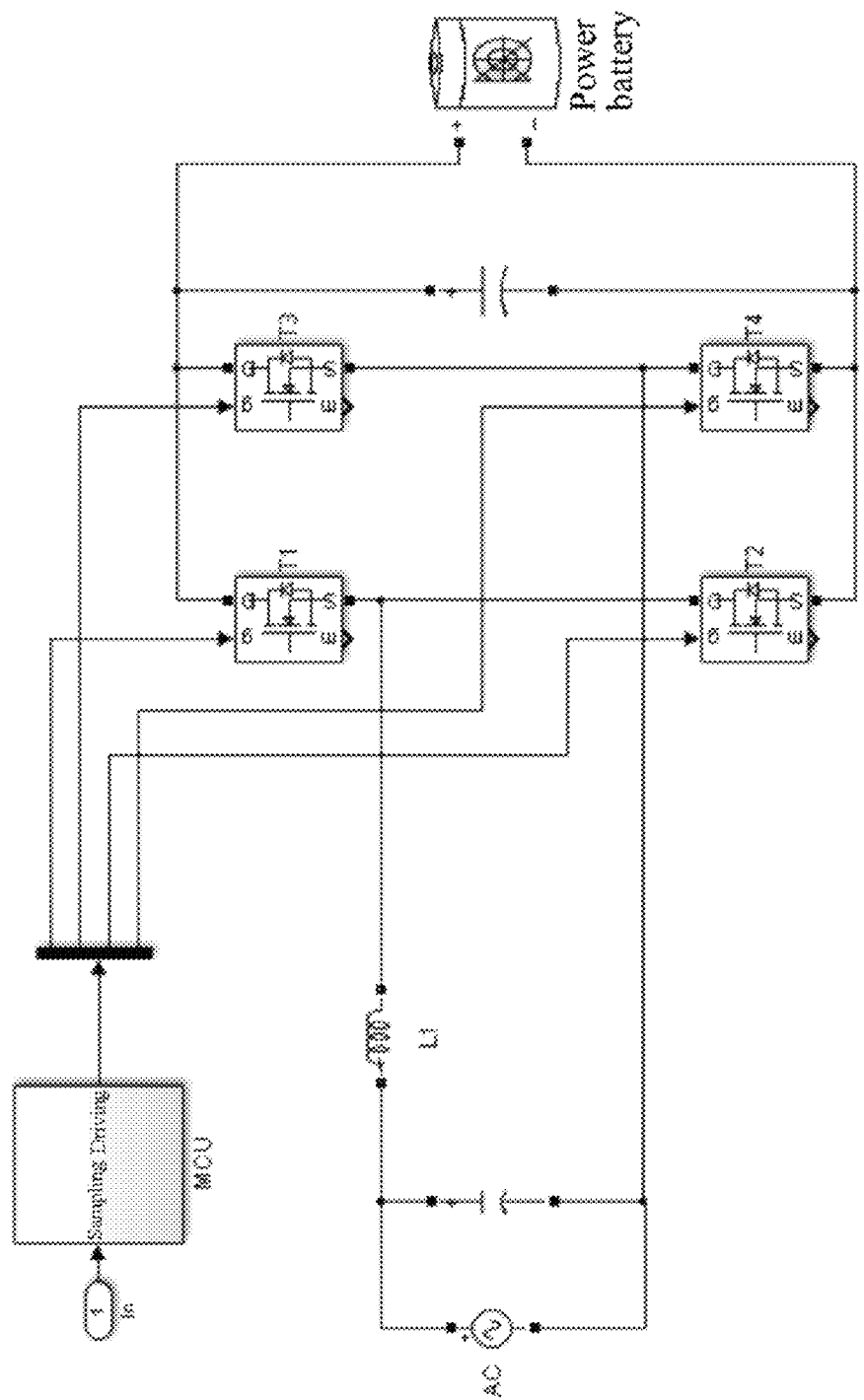
FIG. 2 is a circuit schematic diagram of a vehicle-mounted charger of an electric vehicle of another embodiment of the present disclosure.
Figure 3:
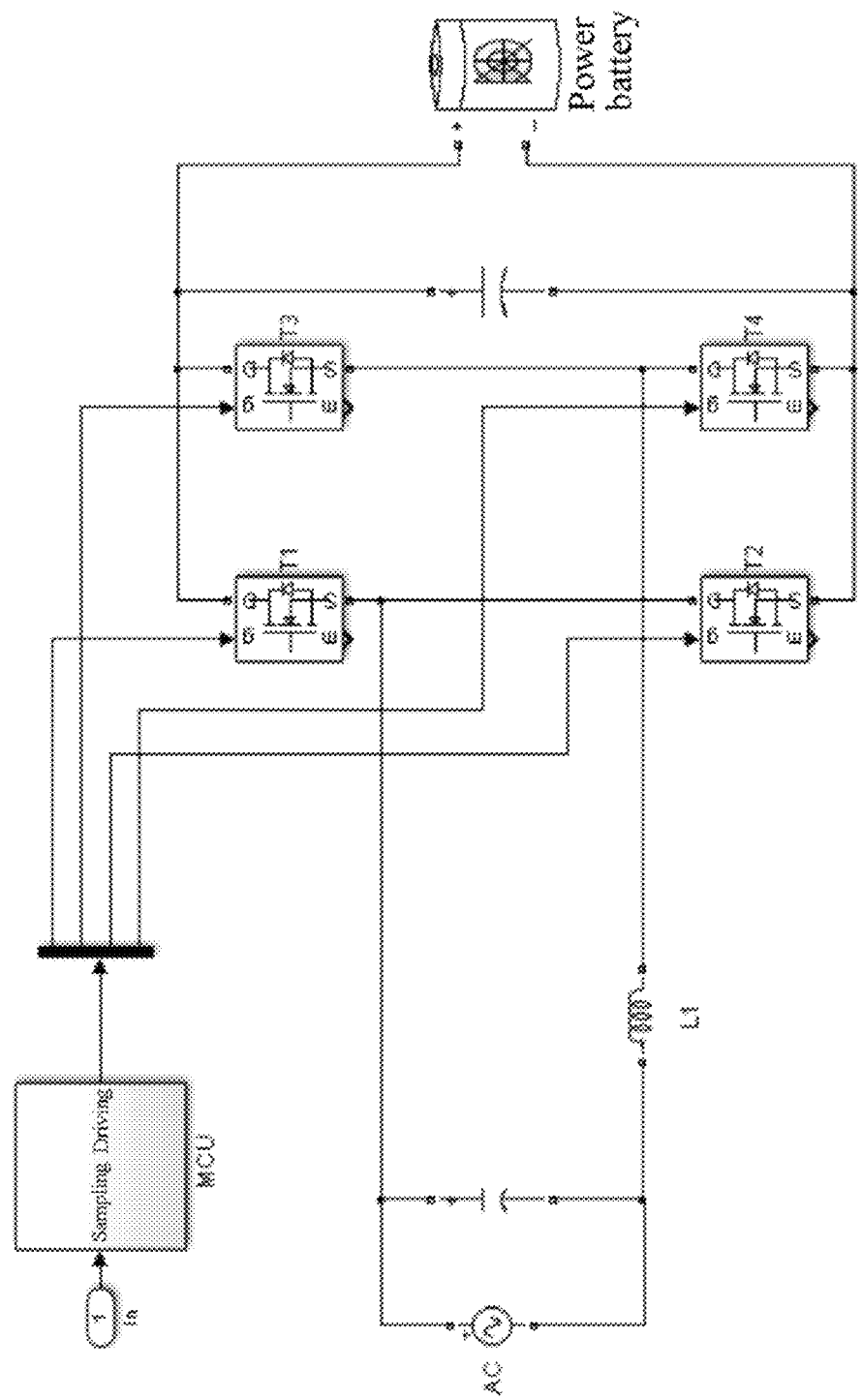
FIG. 3 is a circuit schematic diagram of a vehicle-mounted charger of an electric vehicle of still another embodiment of the present disclosure.

FIGS. 1 to 3 show a connecting manner of a vehicle-mounted charger of an electric vehicle according to an embodiment of the present disclosure. As shown in FIGS. 1 to 3, the vehicle-mounted charger of an electric vehicle according to embodiments of the present disclosure includes an H bridge. The H bridge includes a first switch tube T1, a second switch tube T2, a third switch tube T3 and a fourth switch tube T4. The vehicle-mounted charger of an electric vehicle as shown in FIG. 1 includes a first inductor L1 and a second inductor L2, in which a first end of the first inductor L1 is connected to one end of a load or an anode end of an alternating current power grid AC, and a first end of the second inductor L2 is connected to the other end of the load or a cathode end of the alternating current power grid AC, and a second end of the first inductor L1 and a second end of the second inductor L2 are connected to the H bridge. The vehicle-mounted charger of an electric vehicle as shown in FIG. 2 merely includes an inductor, for example, the inductor L1, in which a first end of the first inductor L1 is connected to one end of a load or an anode end of an alternating current power grid AC, and a second end of the first inductor L1 is connected to the H bridge. The vehicle-mounted charger of an electric vehicle as shown in FIG. 3 merely includes an inductor, for example, the first inductor L1, in which a first end of the first inductor L1 is connected to the other end of the load or a cathode end of the alternating current power grid AC, and a second end of the first inductor L1 is connected to the H bridge.

Figure 4:
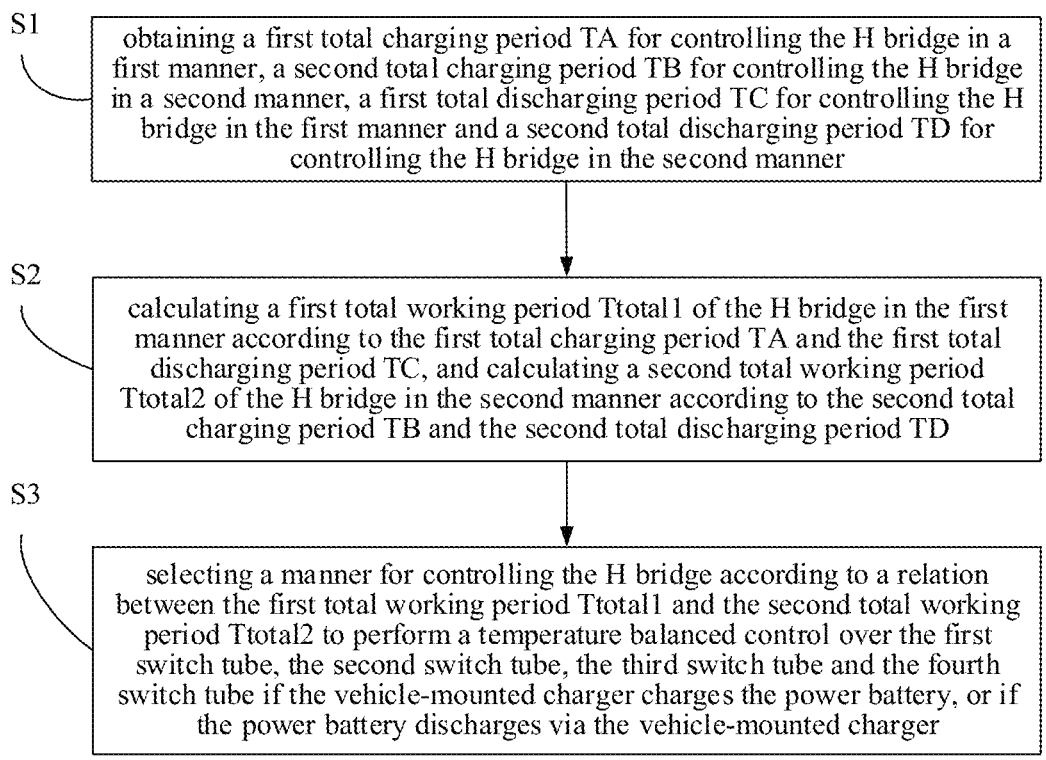
FIG. 4 is a flow chart of a method for controlling a vehicle-mounted charger of an electric vehicle of an embodiment of the present disclosure.

FIG. 4 is a flow chart of a method for controlling a vehicle-mounted charger of an electric vehicle according to an embodiment of the present disclosure. As shown in FIG. 4, the method for controlling a vehicle-mounted charger of an electric vehicle in an embodiment of the present disclosure includes followings.

At step S1, a first total charging period TA for controlling the H bridge in a first manner and a second total charging period TB for controlling the H bridge in a second manner, a first total discharging period TC for controlling the H bridge in the first manner and a second total discharging period TD for controlling the H bridge in the second manner are obtained.

In an embodiment, when the vehicle-mounted charger starts to charge a power battery of the electric vehicle or when the power battery starts to discharge via the vehicle-mounted charger, the first total charging period TA for controlling the H bridge in the first manner and the second total charging period TB for controlling the H bridge in the second manner, the first total discharging period TC for controlling the H bridge in the first manner and the second total discharging period TD for controlling the H bridge in the second manner are obtained.

Figure 5:
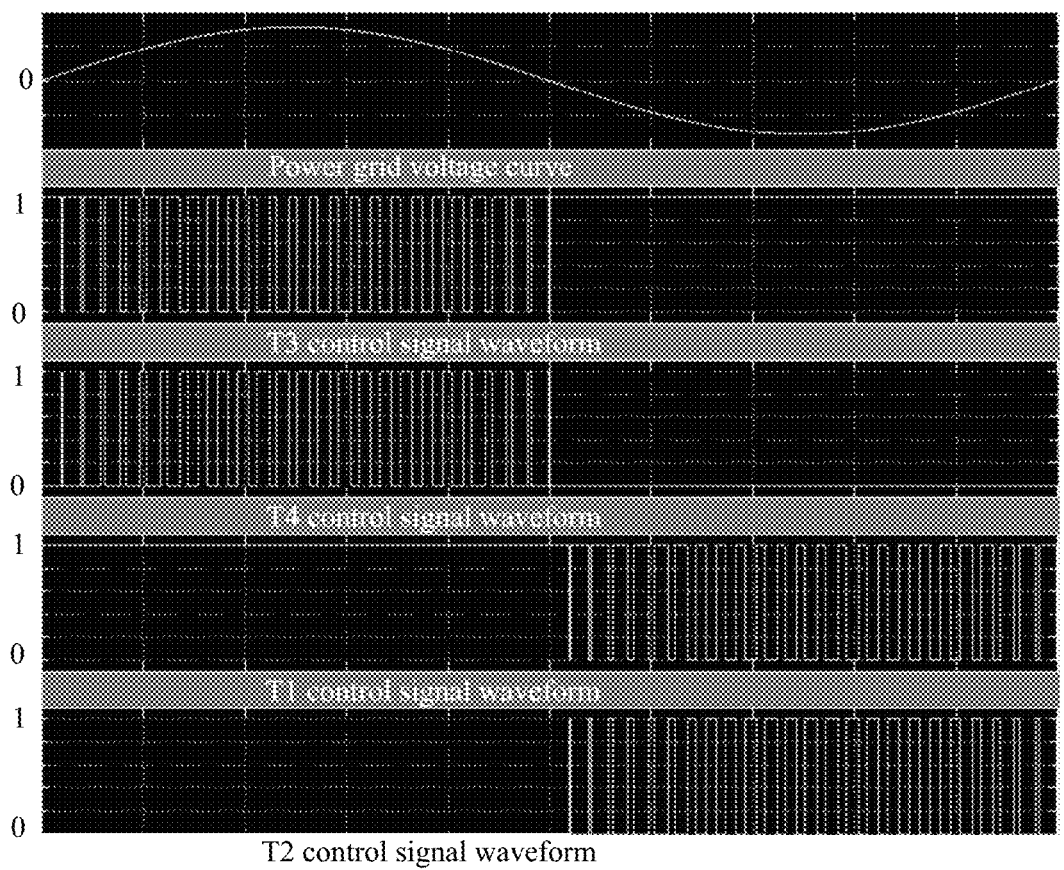
FIG. 5 is a schematic diagram of a control waveform of four switch tubes when an H bridge is controlled by adopting a first manner to charge a power battery according to an embodiment of the present disclosure.

According to an embodiment of the present disclosure, as shown in FIG. 5, if the H bridge is controlled in the first manner A to charge the power battery, and when a power grid transient voltage value of the vehicle-mounted charger is larger than 0, the first switch tube T1 is controlled to be ON, the second switch tube T2 is controlled to be OFF, and the third switch tube T3 and the fourth switch tube T4 are controlled to be ON and OFF complementarily and alternately. When the third switch tube T3 and the fourth switch tube T4 are controlled to be ON and OFF alternately and complementarily, the PWM waveform of the third switch tube T3 and the PWM waveform of the fourth switch tube T4 are controlled to be complementary with each other, and a duty ratio of the PWM waveform of the third switch tube T3 is controlled from large to small and then to large, and a duty ratio of the PWM waveform of the fourth switch tube T4 is controlled from small to large and then to small. When the power grid transient voltage value of the vehicle-mounted charger is smaller than 0, the third switch tube T3 is controlled to be ON, the fourth switch tube T4 is controlled to be OFF, and the first switch tube T1 and the second switch tube T2 are controlled to be ON and OFF complementarily and alternately. When the first switch tube T1 and the second switch tube T2 are controlled to be ON and OFF alternately and complementarily, the PWM waveform of the first switch tube T1 and the PWM waveform of the second switch tube T2 are controlled to be complementary with each other, and a duty ratio of the PWM waveform of the first switch tube T1 is controlled from large to small and then to large, and a duty ratio of the PWM waveform of the second switch tube T2 is controlled from small to large and then to small.

Figure 6:
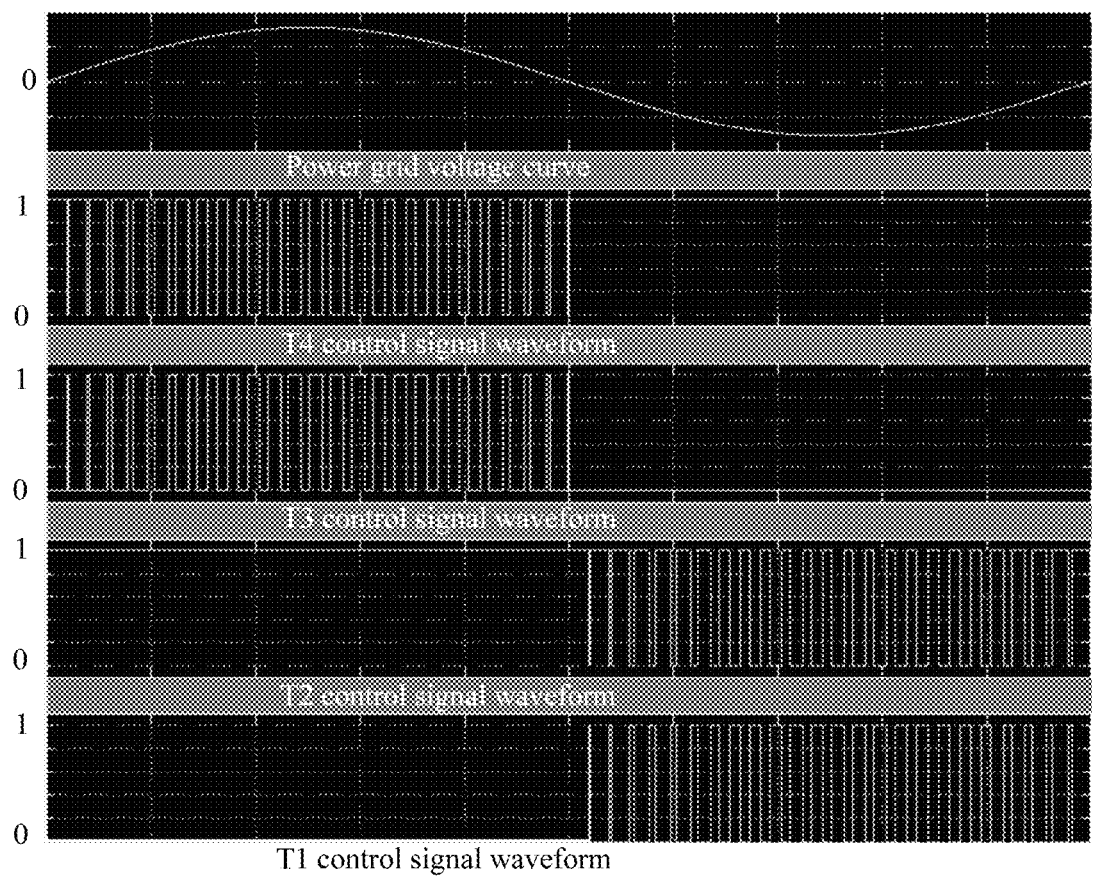
FIG. 6 is a schematic diagram of a control waveform of four switch tubes when an H bridge is controlled by adopting a second manner to charge a power battery according to an embodiment of the present disclosure.

According to an embodiment of the present disclosure, as shown in FIG. 6, if the H bridge is controlled in the second manner B to charge the power battery, and when the power grid transient voltage value of the vehicle-mounted charger is larger than 0, the second switch tube T2 is controlled to be ON, the first switch tube T1 is controlled to be OFF, and the third switch tube T3 and the fourth switch tube T4 are controlled to be ON and OFF complementarily and alternately. When the third switch tube T3 and the fourth switch tube T4 are controlled to be ON and OFF alternately and complementarily, the PWM waveform of the third switch tube T3 and the PWM waveform of the fourth switch tube T4 are controlled to be complementary with each other, and a duty ratio of the PWM waveform of the third switch tube T3 is controlled from small to large and then to small, and a duty ratio of the PWM waveform of the fourth switch tube T4 is controlled from large to small and then to large. When the power grid transient voltage value of the vehicle-mounted charger is smaller than 0, the fourth switch tube T4 is controlled to be ON, the third switch tube T3 is controlled to be OFF, and the first switch tube T1 and the second switch tube T2 are controlled to be ON and OFF complementarily and alternately. When the first switch tube T1 and the second switch tube T2 are controlled to be ON and OFF alternately and complementarily, the PWM waveform of the first switch tube T1 and the PWM waveform of the second switch tube T2 are controlled to be complementary with each other, and a duty ratio of the PWM waveform of the first switch tube T1 is controlled from small to large and then to small, and a duty ratio of the PWM waveform of the second switch tube T2 is controlled from large to small and then to large.

Figure 7:
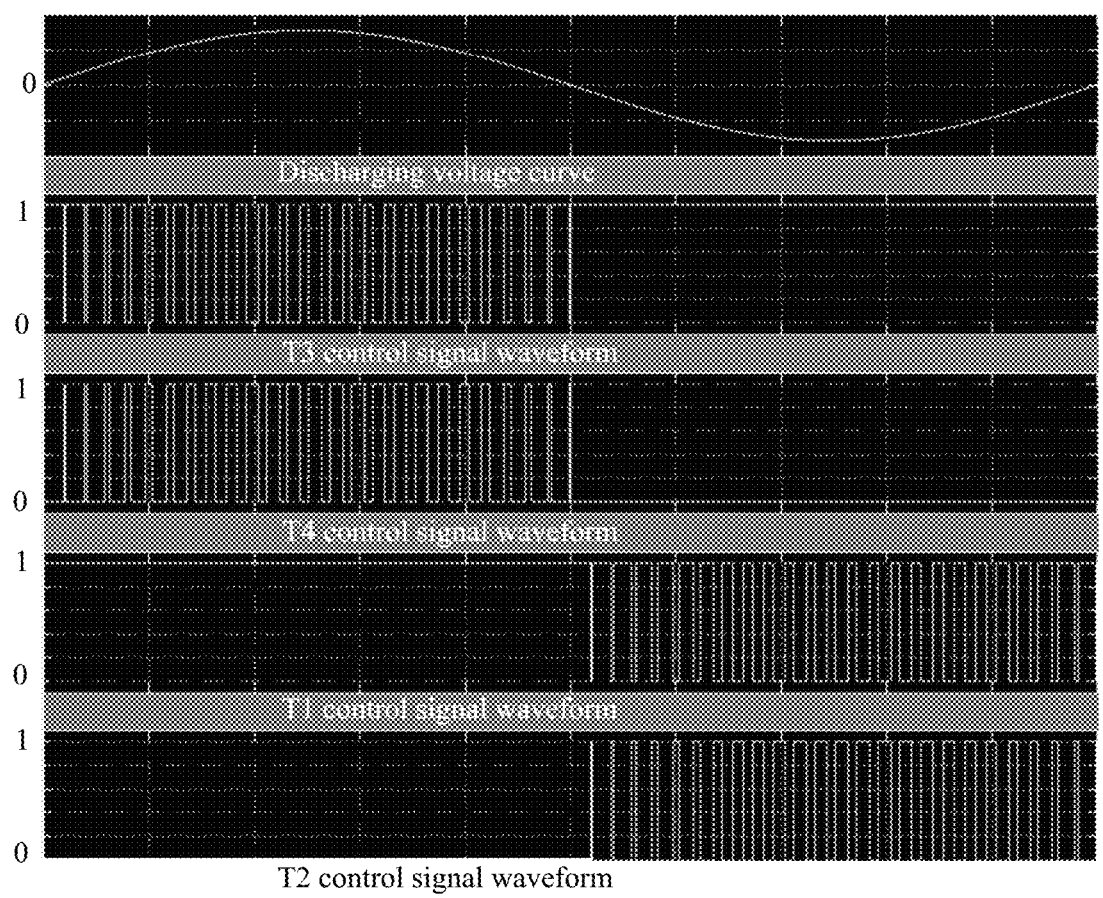
FIG. 7 is a schematic diagram of a control waveform of four switch tubes when an H bridge is controlled by adopting a first manner to enable a power battery to outwards discharge according to an embodiment of the present disclosure.

According to an embodiment of the present disclosure, as shown in FIG. 7, if the H bridge is controlled in the first manner A to enable a power battery to outwards discharge, and when an outward discharging transient voltage value of the vehicle-mounted charger is larger than 0, the first switch tube T1 is controlled to be ON, the second switch tube T2 is controlled to be OFF, and the third switch tube T3 and the fourth switch tube T4 are controlled to be ON and OFF complementarily and alternately. When the third switch tube T3 and the fourth switch tube T4 are controlled to be ON and OFF alternately and complementarily, the PWM waveform of the third switch tube T3 and the PWM waveform of the fourth switch tube T4 are controlled to be complementary with each other, and a duty ratio of the PWM waveform of the third switch tube T3 is controlled from large to small and then to large, and a duty ratio of the PWM waveform of the fourth switch tube T4 is controlled from small to large and then to small. When the outward discharging transient voltage value of the vehicle-mounted charger is smaller than 0, the third switch tube T3 is controlled to be ON, the fourth switch tube T4 is controlled to be OFF, and the first switch tube T1 and the second switch tube T2 are controlled to be ON and OFF complementarily and alternately. When the first switch tube T1 and the second switch tube T2 are controlled to be ON and OFF alternately and complementarily, the PWM waveform of the first switch tube T1 and the PWM waveform of the second switch tube T2 are controlled to be complementary with each other, and a duty ratio of the PWM waveform of the first switch tube T1 is controlled from large to small and then to large, and a duty ratio of the PWM waveform of the second switch tube T2 is controlled from small to large and then to small.

Figure 8:
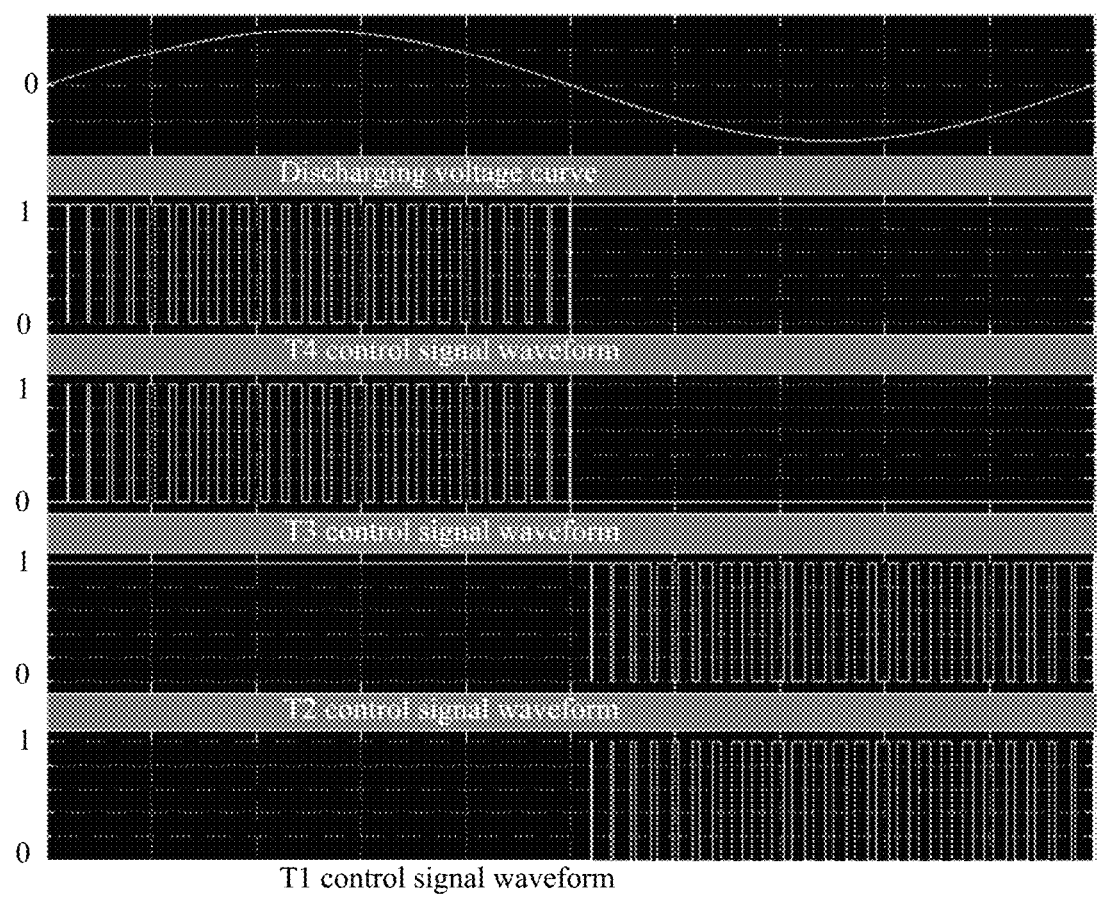
FIG. 8 is a schematic diagram of a control waveform of four switch tubes when an H bridge is controlled by adopting a second manner to enable a power battery to outwards discharge according to an embodiment of the present disclosure.

According to an embodiment of the present disclosure, as shown in FIG. 8, if the H bridge is controlled in the second manner B to enable the power battery to outwards discharge, and when the outward discharging transient voltage value of the vehicle-mounted charger is larger than 0, the second switch tube T2 is controlled to be ON, the first switch tube T1 is controlled to be OFF, and the third switch tube T3 and the fourth switch tube T4 are controlled to be ON and OFF complementarily and alternately. When the third switch tube T3 and the fourth switch tube T4 are controlled to be ON and OFF alternately and complementarily, the PWM waveform of the third switch tube T3 and the PWM waveform of the fourth switch tube T4 are controlled to be complementary with each other, and a duty ratio of the PWM waveform of the third switch tube T3 is controlled from small to large and then to small, and a duty ratio of the PWM waveform of the fourth switch tube T4 is controlled from large to small and then to large. When the outward discharging transient voltage value of the vehicle-mounted charger is smaller than 0, the fourth switch tube T4 is controlled to be ON, the third switch tube T3 is controlled to be OFF, and the first switch tube T1 and the second switch tube T2 are controlled to be ON and OFF complementarily and alternately. When the first switch tube T1 and the second switch tube T2 are controlled to be ON and OFF alternately and complementarily, the PWM waveform of the first switch tube T1 and the PWM waveform of the second switch tube T2 are controlled to be complementary with each other, and a duty ratio of the PWM waveform of the first switch tube T1 is controlled from small to large and then to small, and a duty ratio of the PWM waveform of the second switch tube T2 is controlled from large to small and then to large.

At step S2, a first total working period Ttotal1 of the H bridge in the first manner is calculated according to the first total charging period TA and the first total discharging period TC, and a second total working period Ttotal2 of the H bridge in the second manner is calculated according to the second total charging period TB and the second total discharging period TD.

At step S3, a manner for controlling the H bridge is selected according to the relation between the first total working period Ttotal1 and the second total working period Ttotal2 to perform a temperature balanced control over the first switch tube, the second switch tube, the third switch tube and the fourth switch tube if the vehicle-mounted charger charges the power battery, or if the power battery discharges via the vehicle-mounted charger.

In an embodiment, step S3 includes as follows.

At step S31, the manner from the first manner and the second manner for controlling the H bridge is selected according to the relation between the first total working period Ttotal1 and the second total working period Ttotal2.

At step S32, the H bridge in the selected manner is controlled to perform the temperature balanced control over the first switch tube, the second switch tube, the third switch tube and the fourth switch tube if the vehicle-mounted charger charges the power battery, or if the power battery discharges via the vehicle-mounted charger.

In the process of charging the power battery by the vehicle-mounted charger, as shown in FIG. 5, if the H bridge is only controlled by adopting the first manner A, when the power grid transient voltage value is larger than 0, the first switch tube T1 is kept ON always, the second switch tube T2 is kept OFF always, and the third switch tube T3 and fourth switch tube T4 are ON and OFF alternately and complementarily, and the inductor in the vehicle-mounted charger is charged when the third switch tube T3 is ON and the fourth switch tube T4 is OFF, and discharges when the third switch tube T3 is OFF and the fourth switch tube T4 is ON; when the power grid transient voltage value is smaller than 0, the third switch tube T3 is kept ON always, the fourth switch tube T4 is kept OFF always, and the first switch tube T1 and second switch tube T2 are ON and OFF alternately and complementarily, and the inductor in the vehicle-mounted charger is charged when the first switch tube T1 is ON and the second switch tube T2 is OFF, and discharges when the first switch tube T1 is OFF and the second switch tube T2 is ON. Since the inductor is charged when the first switch tube T1 and the third switch tube T3 are ON, the ON duty ratio is larger, therefore, the first switch tube T1 and the third switch tube T3 are overheated.

Similarly, in the process of charging the power battery by the vehicle-mounted charger, as shown in FIG. 6, if the H bridge is only controlled by adopting the second manner B, when the power grid transient voltage value is larger than 0, the first switch tube T1 is kept OFF always, the second switch tube T2 is kept ON always, and the third switch tube T3 and fourth switch tube T4 are ON and OFF alternately and complementarily, and the inductor in the vehicle-mounted charger is charged when the fourth switch tube T4 is ON and the third switch tube T3 is OFF, and discharges when the fourth switch tube T4 is OFF and the third switch tube T3 is ON; when the power grid transient voltage value is smaller than 0, the fourth switch tube T4 is kept ON always, the third switch tube T3 is kept OFF always, and the first switch tube T1 and second switch tube T2 are ON and OFF alternately and complementarily, and the inductor in the vehicle-mounted charger is charged when the second switch tube T2 is ON and the first switch tube T1 is OFF, and discharges when the second switch tube T2 is OFF and the first switch tube T1 is ON. Since the inductor is charged when the second switch tube T2 and the fourth tube T4 are ON, the ON duty ratio is larger, therefore, the second switch tube T2 and the fourth switch tube T4 are overheated.

In the process of discharging from the power battery via the vehicle-mounted charger, as shown in FIG. 7, if the H bridge is only controlled by adopting the first manner A, when the outward discharging transient voltage value is larger than 0, the first switch tube T1 is kept ON always, the second switch tube T2 is kept OFF always, and the third switch tube T3 and fourth switch tube T4 are alternately and complementarily ON and OFF, and the inductor in the vehicle-mounted charger is charged when the third switch tube T3 is OFF and the fourth switch tube T4 is ON, and discharges when the third switch tube T3 is ON and the fourth switch tube T4 is OFF; when the outward discharging transient voltage value is smaller than 0, the third switch tube T3 is kept ON always, the fourth switch tube T4 is kept OFF always, and the first switch tube T1 and second switch tube T2 are alternately and complementarily ON and OFF, and the inductor in the vehicle-mounted charger is charged when the first switch tube T1 is OFF and the second switch tube T2 is ON, and discharges when the first switch tube T1 is ON and the second switch tube T2 is OFF. Since the inductor is charged when the second switch tube T2 and the fourth switch tube T4 are ON, the second switch tube T2 and the fourth switch tube T4 are OFF with current, and hard switching is performed, therefore, the second switch tube T2 and the fourth switch tube T4 are overheated.

Similarly, in the process of discharging from the power battery via the vehicle-mounted charger, as shown in FIG. 8, if the H bridge is only controlled by adopting the second manner B, when the outward discharging transient voltage value is larger than 0, the first switch tube T1 is kept OFF always, the second switch tube T2 is kept ON always, and the third switch tube T3 and fourth switch tube T4 are alternately and complementarily ON and OFF, and the inductor in the vehicle-mounted charger is charged when the fourth switch tube T4 is OFF and the third switch tube T3 is ON, and discharges when the fourth switch tube T4 is ON and the third switch tube T3 is OFF; when the outward discharging transient voltage value is smaller than 0, the fourth switch tube T4 is kept ON always, the third switch tube T3 is kept OFF always, and the first switch tube T1 and second switch tube T2 are alternately and complementarily ON and OFF, and the inductor in the vehicle-mounted charger is charged when the second switch tube T2 is OFF and the first switch tube T1 is ON, and discharges when the second switch tube T2 is ON and the first switch tube T1 is OFF. Since the inductor is charged when the first switch tube T1 and the third switch tube T3 are ON, the first switch tube T1 and the third switch tube T3 are OFF with current, and hard switching is performed, therefore, the first switch tube T1 and the third switch tube T3 are overheated.

Therefore, in an embodiment of the present disclosure, the H bridge is controlled by adopting the first manner A, such that when the vehicle-mounted charger charges the power battery, the period that the H bridge is controlled in the first manner A is recorded, thus the first total charging period TA for controlling the H bridge in the first manner is obtained, and is then stored; the H bridge is controlled by adopting the first manner A, such that when the power battery outwards discharges via the vehicle-mounted charger, the period that the H bridge is controlled in the first manner A is recorded, thus the first total discharging period TC for controlling the H bridge in the first manner is obtained, and is then stored;

the H bridge is controlled by adopting the second manner B, such that when the vehicle-mounted charger charges the power battery, the period that the H bridge is controlled by the second manner B is recorded, thus the second total charging period TB for controlling the H bridge in the second manner is obtained, and is then stored; the H bridge is controlled by adopting the second manner B, such that when the power battery outwards discharges via the vehicle-mounted charger, the period that the H bridge is controlled by the second manner B is recorded, thus the second total discharging period TD for controlling the H bridge in the second manner is obtained, and is then stored. Then, the first total working period Ttotal1 that the H bridge is controlled in the first manner A to charge the power battery and to enable the power battery to outwards discharge is calculated, the second total working period Ttotal2 that the H bridge is controlled in the second manner B to charge the power battery and to enable the power battery to outwards discharge is calculated, and the relation between the first total working period Ttotal1 and the second total working period Ttotal2 is judged. Finally, the manner of controlling the H bridge is selected according to the relation between the first total working period Ttotal1 and the second total working period Ttotal2, thereby realizing the temperature balanced control over the first switch tube, the second switch tube, the third switch tube and the fourth switch tube.

In an embodiment, according to an embodiment of the present disclosure, selecting the manner from the first manner and the second manner for controlling the H bridge according to the relation between the first total working period Ttotal1 and the second total working period Ttotal2 includes: if the first total working period Ttotal1 is larger than the second total working period Ttotal2, selecting the second manner B for controlling the H bridge when the vehicle-mounted charger starts to charge the power battery or the power battery starts to outwards discharge via the vehicle-mounted charger till the second total working period Ttotal2 that the H bridge works in the second manner B is equal to the first total working period Ttotal1 that the H bridge works in the first manner A; if the first total working period Ttotal1 is smaller than the second total working period Ttotal2, selecting the first manner A for controlling the H bridge when the vehicle-mounted charger starts to charge the power battery or the power battery starts to outwards discharge via the vehicle-mounted charger till the first total working period Ttotal1 that the H bridge works in the first manner A is equal to the second total working period Ttotal2 that the H bridge works in the second manner B; if the first total working period Ttotal1 is equal to the second total working period Ttotal2, selecting the first manner A or the second manner B for controlling the H bridge when the vehicle-mounted charger starts to charge the power battery or the power battery starts to outwards discharge via the vehicle-mounted charger.

That is to say, before the vehicle-mounted charger charges the power battery or before the power battery outwards discharges via the vehicle-mounted charger, the first total charging period TA that the H bridge is controlled in the first manner A and the first total discharging period TC that the H bridge is controlled in the first manner A as well as the second total charging period TB that the H bridge is controlled in the second manner B and the second total discharging period TD that the H bridge is controlled in the second manner B are obtained from a storage region. Then the first total working period Ttotal1 that the H bridge is controlled in the first manner A to charge the power battery and to enable the power battery to outwards discharge is calculated, the second total working period Ttotal2 that the H bridge is controlled in the second manner B to charge the power battery and to enable the power battery to outwards discharge is calculated, and the aim of judging the first total working period Ttotal1 and the second total working period Ttotal2 is to confirm the firstly selected manner of controlling the H bridge when the vehicle-mounted charger starts to charge the power battery or the power battery starts to outwards discharge.

After the manner is selected during each charging cycle, the H bridge is controlled to charge the power battery according to a fixed manner, i.e., the first or second manner, the total charging period is recorded when the manner is switched, for example, when the H bridge is firstly controlled by adopting the first manner, the first total charging period, recorded in this manner switching, is the first total charging period obtained from the storage region when this charging starts plus the charging period recorded in the charging cycle of this time.

Similarly, after the manner is selected during each discharging cycle, the H bridge is controlled to enable the power battery to discharge via the vehicle-mounted charger according to a fixed manner, i.e., the first or second manner, the total discharging period is recorded when the manner is switched, for example, when the H bridge is firstly controlled by adopting the first manner, the first total discharging period, recorded in this manner switching, is the first total discharging period obtained from the storage region when this discharging starts plus the charging period recorded in the discharging cycle of this time.

Figure 9:
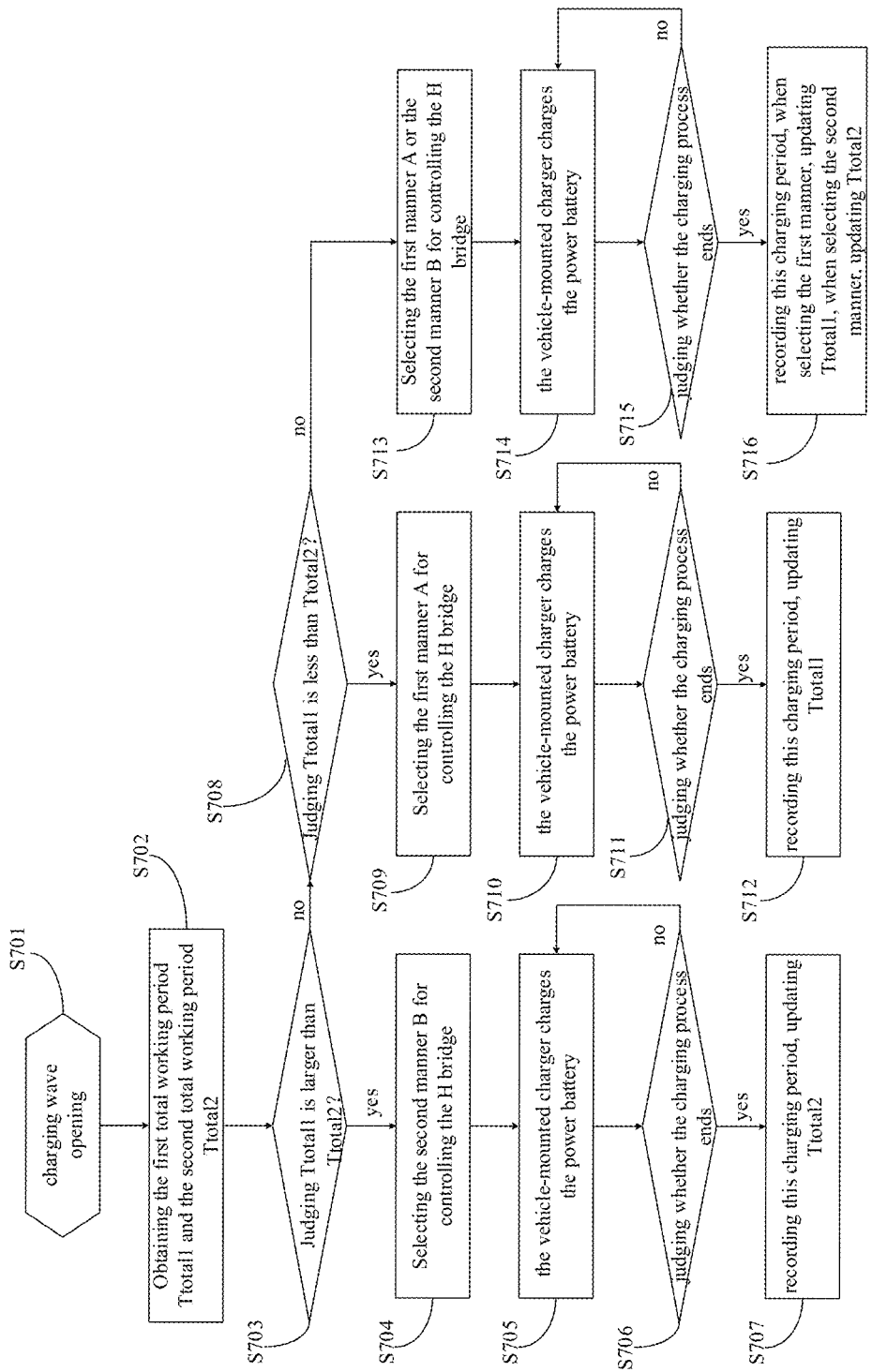
FIG. 9 is a control flow chart when a power battery is charged via a vehicle-mounted charger according to a specific embodiment of the present disclosure.

In an embodiment, as shown in FIG. 9, the method for controlling a vehicle-mounted charger of an electric vehicle includes the followings.

At step S701, a charging wave is opened, i.e., when the vehicle-mounted charger charges the power battery, a control waveform needs to be output to control the switch tubes in the H bridge.

At step S702, the first total working period Ttotal1 in the first manner A and the second total working period Ttotal2 in the second manner B are obtained.

At step S703, it is judged whether the first total working period Ttotal1 is larger than the second total working period Ttotal2 in the second manner, step S704 is executed if yes, and step S708 is executed if not.

At step S704, the second manner B is selected to control the H bridge, then step S705 is executed.

At step S705, the vehicle-mounted charger charges the power battery, then step S706 is executed.

At step S706, it is judged whether the charging process ends, step S707 is executed if yes and step S705 is executed if not.

At step S707, this charging period is recorded, such that the updated second total working period Ttotal2 equals to the second total working period Ttotal2 obtained from the storage region summing this charging period.

At step S708, it is judged whether the first total working period Ttotal1 is less than the second total working period Ttotal2, step S709 is executed if yes, and step S713 is executed if not.

At step S709, the first manner A is selected to control the H bridge, then step S710 is executed.

At step S710, the vehicle-mounted charger charges the power battery, then step S711 is executed.

At step S711, it is judged whether the charging process ends, step S712 is executed if yes and step S710 is executed if not.

At step S712, this charging period is recorded, such that the updated first total working period Ttotal1 equals to the first total working period Ttotal1 obtained from the storage region summing this charging period.

At step S713, the first manner A or the second manner B is selected to control the H bridge, then step S714 is executed.

At step S714, the vehicle-mounted charger charges the power battery, then step S715 is executed.

At step S715, it is judged whether the charging process ends, step S716 is executed if yes, and step S714 is executed if not.

At step S716, this charging period is recorded. In which, if the first manner A is selected, such that the updated first total working period Ttotal1 is equal to the first total working period Ttotal1 obtained from the storage region summing this charging period; if the second manner B is selected, such that the updated second total working period Ttotal2 is equal to the second total working period Ttotal2 obtained from the storage region summing this charging period.

Figure 10:
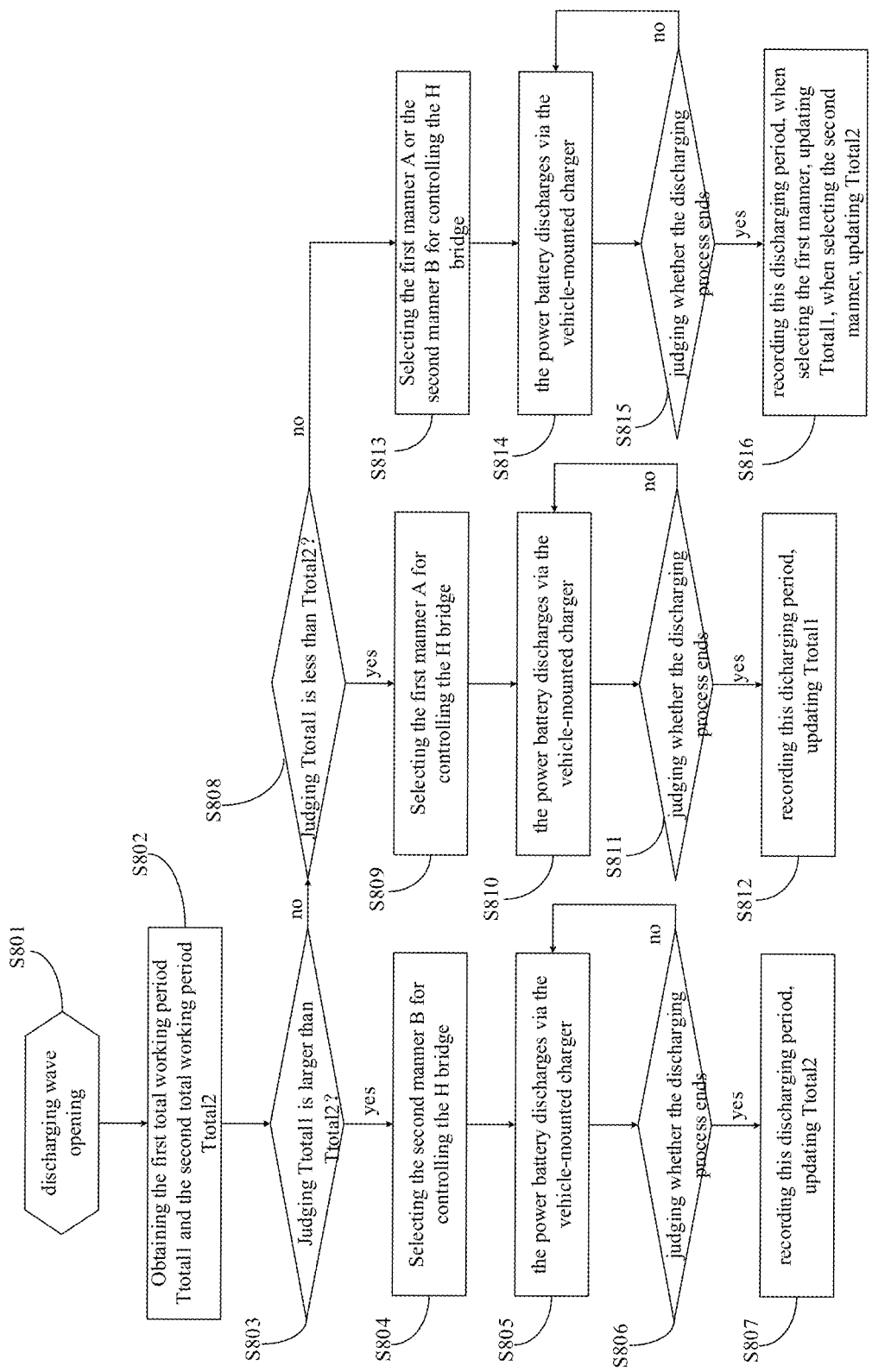
FIG. 10 is a control flow chart when a power battery discharges via a vehicle-mounted charger according to a specific embodiment of the present disclosure.

In an embodiment, as shown in FIG. 10, the method for controlling a vehicle-mounted charger of an electric vehicle includes the followings.

At step S801, a discharging wave is opened, i.e., when the power battery discharges via the vehicle-mounted charger, a control waveform needs to be output to control the switch tubes in the H bridge.

At step S802, the first total working period Ttotal1 in the first manner A and the second total working period Ttotal2 in the second manner B are obtained.

At step S803, it is judged whether the first total working period Ttotal1 is larger than the second total working period Ttotal2, step S804 is executed if yes, and step S808 is executed if not.

At step S804, the second manner B is selected to control the H bridge, then step S805 is executed.

At step S805, the power battery discharges via the vehicle-mounted charger, then step S806 is executed.

At step S806, it is judged whether the discharging process ends, step S807 is executed if yes and step S805 is executed if not.

At step S807, this discharging period is recorded, such that the updated second total working period Ttotal2 equals to the second total working period Ttotal2 obtained from the storage region summing this discharging period.

At step S808, it is judged whether the first total working period Ttotal1 is less than the second total working period Ttotal2, step S809 is executed if yes, and step S813 is executed if not.

At step S809, the first manner A is selected to control the H bridge, then step S810 is executed.

At step S810, the power battery discharges via the vehicle-mounted charger, then step S811 is executed.

At step S811, it is judged whether the discharging process ends, step S812 is executed if yes and step S810 is executed if not.

At step S812, this discharging period is recorded, such that the updated first total working period Ttotal1 equals to the first total working period Ttotal1 obtained from the storage region summing this discharging period.

At step S813, the first manner A or the second manner B is selected to control the H bridge, then step S814 is executed.

At step S814, the power battery discharges via the vehicle-mounted charger, then step S815 is executed.

At step S815, it is judged whether the discharging process ends, step S816 is executed if yes, and step S814 is executed if not.

At step S816, this discharging period is recorded. In which, if the first manner A is selected, such that the updated first total working period Ttotal1 is equal to the first total working period Ttotal1 obtained from the storage region summing this discharging period; if the second manner B is selected, such that the updated second total working period Ttotal2 equals to the second total working period Ttotal2 obtained from the storage region summing this discharging period.

Therefore, according to the method for controlling a vehicle-mounted charger of an electric vehicle, by recording the first total charging period in the first manner for controlling the H bridge or the second total charging period in the second manner for controlling the H bridge when charging every time, and the first total discharging period in the first manner for controlling the H bridge or the second total discharging period in the second manner for controlling the H bridge when discharging from the power battery every time, then recording the first total working period Ttotal1 adopting the first manner A and the second total working period Ttotal2 adopting the second manner B, and then determining the relation of the first total working period Ttotal1 and the second total working period Ttotal2, so as to perform the temperature balanced control over the first switch tube, the second switch tube, the third switch tube and the fourth switch tube, such that the heating of the first switch tube, the second switch tube, the third switch tube and the fourth switch tube is enabled to be relative balanced, and the service life of the vehicle-mounted charger is prolonged.

According to the method for controlling a vehicle-mounted charger of an electric vehicle in embodiments of the present disclosure, the first total working period of the H bridge in the first manner is calculated according to the obtained first total charging period and the obtained first total discharging period, and the second total working period of the H bridge in the second manner is calculated according to the obtained second total charging period and the obtained second total discharging period, and then the manner for controlling the H bridge is selected from the first manner and the second manner according to the relation between the first total working period and the second total working period when the vehicle-mounted charger charges the power battery or when the power battery outwards discharges via the vehicle-mounted charger to perform the temperature balanced control over the first switch tube, the second switch tube, the third switch tube and the fourth switch tube, such that the heating of each switch tube is relatively balanced, the service life of the switch tubes in the H bridge is prolonged, and thus the service period is prolonged.

As shown in FIGS. 1 to 3, a vehicle-mounted charger according to embodiments of the present disclosure includes an H bridge and a controller such as an MCU (Micro Control Unit). The H bridge includes a first switch tube T1, a second switch tube T2, a third switch tube T3 and a fourth switch tube T4. The controller is configured to obtain a first total charging period TA for controlling the H bridge in a first manner, a second total charging period TB for controlling the H bridge in a second manner, a first total discharging period TC for controlling the H bridge in the first manner and a second total discharging period TD for controlling the H bridge in the second manner, when the vehicle-mounted charger charges a power battery of the electric vehicle or when the power battery discharges via the vehicle-mounted charger; to calculate a first total working period Ttotal1 of the H bridge in the first manner according to the first total charging period TA and the first total discharging period TC and to calculate a second total working period Ttotal2 of the H bridge in the second manner according to the second total charging period TB and the second total discharging period TD; and to select a manner for controlling the H bridge according to a relation between the first total working period Ttotal1 and the second total working period Ttotal2 to perform a temperature balanced control over the first switch tube, the second switch tube, the third switch tube and the fourth switch tube if the vehicle-mounted charger charges the power battery or if the power battery discharges via the vehicle-mounted charger.

In an embodiment, the controller is further configured to: select the manner from the first manner and the second manner for controlling the H bridge according to the relation between the first total working period Ttotal1 and the second total working period Ttotal2; and control the H bridge in the selected manner to perform the temperature balanced control over the first switch tube, the second switch tube, the third switch tube and the fourth switch tube if the vehicle-mounted charger charges the power battery, or if the power battery discharges via the vehicle-mounted charger.

In an embodiment, according to an embodiment of the present disclosure, the controller is configured to select the manner for controlling the H bridge according to the relation between the first total working period Ttotal1 and the second total working period Ttotal2 by steps of: if the first total working period Ttotal1 is larger than the second total working period Ttotal2, the controller selects the second manner B for controlling the H bridge; if the first total working period Ttotal1 is less than the second total working period Ttotal2, the controller selects the first manner A for controlling the H bridge; if the first total working period Ttotal1 is equal to the second total working period Ttotal2, the controller selects the first manner A or the second manner B for controlling the H bridge.

That is to say, before the vehicle-mounted charger charges the power battery or before the power battery outwards discharges via the vehicle-mounted charger, the first total charging period TA that the H bridge is controlled in the first manner A and the first total discharging period TC that the H bridge is controlled in the first manner A as well as the second total charging period TB that the H bridge is controlled in the second manner B and the second total discharging period TD that the H bridge is controlled in the second manner B are obtained from a storage region. Then the first total working period Ttotal1 that the H bridge is controlled in the first manner A to charge the power battery and to enable the power battery to outwards discharge is calculated, the second total working period Ttotal2 that the H bridge is controlled in the second manner B to charge the power battery and to enable the power battery to outwards discharge is calculated, and the aim of judging the first total working period Ttotal1 and the second total working period Ttotal2 is to confirm the firstly selected manner of controlling the H bridge when the vehicle-mounted charger starts to charge the power battery or the power battery starts to outwards discharge, so as to perform the temperature balanced control over the first switch tube, the second switch tube, the third switch tube and the fourth switch tube if the vehicle-mounted charger charges the power battery or if the power battery discharges via the vehicle-mounted charger.

According to an embodiment of the present disclosure, if the H bridge is controlled in the first manner A to charge a power battery, and when a power grid transient voltage value of the vehicle-mounted charger is larger than 0, the first switch tube T1 is controlled to be ON, the second switch tube T2 is controlled to be OFF, and the third switch tube T3 and the fourth switch tube T4 are controlled to be ON and OFF complementarily and alternately. When the third switch tube T3 and the fourth switch tube T4 are controlled to be ON and OFF alternately and complementarily, the PWM waveform of the third switch tube T3 and the PWM waveform of the fourth switch tube T4 are controlled to be complementary with each other, and a duty ratio of the PWM waveform of the third switch tube T3 is controlled from large to small and then to large, and a duty ratio of the PWM waveform of the fourth switch tube T4 is controlled from small to large and then to small. When the power grid transient voltage value of the vehicle-mounted charger is smaller than 0, the third switch tube T3 is controlled to be ON, the fourth switch tube T4 is controlled to be OFF, and the first switch tube T1 and the second switch tube T2 are controlled to be ON and OFF complementarily and alternately. When the first switch tube T1 and the second switch tube T2 are controlled to be ON and OFF alternately and complementarily, the PWM waveform of the first switch tube T1 and the PWM waveform of the second switch tube T2 are controlled to be complementary with each other, and a duty ratio of the PWM waveform of the first switch tube T1 is controlled from large to small and then to large, and a duty ratio of the PWM waveform of the second switch tube T2 is controlled from small to large and then to small.

According to an embodiment of the present disclosure, if the H bridge is controlled in the second manner B to charge a power battery, and when a power grid transient voltage value of the vehicle-mounted charger is larger than 0, the second switch tube T2 is controlled to be ON, the first switch tube T1 is controlled to be OFF, and the third switch tube T3 and the fourth switch tube T4 are controlled to be ON and OFF complementarily and alternately. When the third switch tube T3 and the fourth switch tube T4 are controlled to be ON and OFF alternately and complementarily, the PWM waveform of the third switch tube T3 and the PWM waveform of the fourth switch tube T4 are controlled to be complementary with each other, and a duty ratio of the PWM waveform of the third switch tube T3 is controlled from small to large and then to small, and a duty ratio of the PWM waveform of the fourth switch tube T4 is controlled from large to small and then to large. When the power grid transient voltage value of the vehicle-mounted charger is smaller than 0, the fourth switch tube T4 is controlled to be ON, the third switch tube T3 is controlled to be OFF, and the first switch tube T1 and the second switch tube T2 are controlled to be ON and OFF complementarily and alternately. When the first switch tube T1 and the second switch tube T2 are controlled to be ON and OFF alternately and complementarily, the PWM waveform of the first switch tube T1 and the PWM waveform of the second switch tube T2 are controlled to be complementary with each other, and a duty ratio of the PWM waveform of the first switch tube T1 is controlled from small to large and then to small, and a duty ratio of the PWM waveform of the second switch tube T2 is controlled from large to small and then to large.

According to one embodiment of the present disclosure, if the H bridge is controlled in the first manner A to enable a power battery to outwards discharge, and when an outward discharging transient voltage value of the vehicle-mounted charger is larger than 0, the first switch tube T1 is controlled to be ON, the second switch tube T2 is controlled to be OFF, and the third switch tube T3 and the fourth switch tube T4 are controlled to be ON and OFF complementarily and alternately. When the third switch tube T3 and the fourth switch tube T4 are controlled to be ON and OFF alternately and complementarily, the PWM waveform of the third switch tube T3 and the PWM waveform of the fourth switch tube T4 are controlled to be complementary with each other, and a duty ratio of the PWM waveform of the third switch tube T3 is controlled from large to small and then to large, and a duty ratio of the PWM waveform of the fourth switch tube T4 is controlled from small to large and then to small. When the outward discharging transient voltage value of the vehicle-mounted charger is smaller than 0, the third switch tube T3 is controlled to be ON, the fourth switch tube T4 is controlled to be OFF, and the first switch tube T1 and the second switch tube T2 are controlled to be ON and OFF complementarily and alternately. When the first switch tube T1 and the second switch tube T2 are controlled to be ON and OFF alternately and complementarily, the PWM waveform of the first switch tube T1 and the PWM waveform of the second switch tube T2 are controlled to be complementary with each other, and a duty ratio of the PWM waveform of the first switch tube T1 is controlled from large to small and then to large, and a duty ratio of the PWM waveform of the second switch tube T2 is controlled from small to large and then to small.

According to an embodiment of the present disclosure, if the H bridge is controlled in the second manner B to enable the power battery to outwards discharge, and when an outward discharging transient voltage value of the vehicle-mounted charger is larger than 0, the second switch tube T2 is controlled to be ON, the first switch tube T1 is controlled to be OFF, and the third switch tube T3 and the fourth switch tube T4 are controlled to be ON and OFF complementarily and alternately. When the third switch tube T3 and the fourth switch tube T4 are controlled to be ON and OFF alternately and complementarily, the PWM waveform of the third switch tube T3 and the PWM waveform of the fourth switch tube T4 are controlled to be complementary with each other, and a duty ratio of the PWM waveform of the third switch tube T3 is controlled from small to large and then to small, and a duty ratio of the PWM waveform of the fourth switch tube T4 is controlled from large to small and then to large. When the outward discharging transient voltage value of the vehicle-mounted charger is smaller than 0, the fourth switch tube T4 is controlled to be ON, the third switch tube T3 is controlled to be OFF, and the first switch tube T1 and the second switch tube T2 are controlled to be ON and OFF complementarily and alternately. When the first switch tube T1 and the second switch tube T2 are controlled to be ON and OFF alternately and complementarily, the PWM waveform of the first switch tube T1 and the PWM waveform of the second switch tube T2 are controlled to be complementary with each other, and a duty ratio of the PWM waveform of the first switch tube T1 is controlled from small to large and then to small, and a duty ratio of the PWM waveform of the second switch tube T2 is controlled from large to small and then to large.

In an embodiment of the present disclosure, as shown in FIG. 1 or FIG. 2 or FIG. 3, the first switch tube T1, the second switch tube T2, the third switch tube T3 and the fourth switch tube T4 are all IGBTs (Insulated Gate Bipolar Transistors), certainly, in other embodiments of the present disclosure, the first switch tube T1, the second switch tube T2, the third switch tube T3 and the fourth switch tube T4 can also be MOSs (Metal Oxide Semiconductors).

According to the vehicle-mounted charger of an electric vehicle in embodiments of the present disclosure, the controller calculates the first total working period of the H bridge in the first manner according to the obtained first total charging period and the obtained first total discharging period, and the second total working period of the H bridge in the second manner according to the obtained second total charging period and the obtained second total discharging period, and then selects the manner of controlling the H bridge from the first manner and the second manner according to the relation between the first total working period and the second total working period to perform the temperature balanced control over the first switch tube, the second switch tube, the third switch tube and the fourth switch tube if the vehicle-mounted charger charges the power battery, or if the power battery discharges via the vehicle-mounted charger, such that the heating of each switch tube is relatively balanced, the service life of the switch tubes in the H bridge is prolonged, and thus the service period is prolonged.

In addition, embodiments of the present disclosure also provide an electric vehicle, including the above vehicle-mounted charger of an electric vehicle.

According to the electric vehicle of embodiments of the present disclosure, when the power battery is charged and discharged by the vehicle-mounted charger, the temperature balanced control over the first switch tube, the second switch tube, the third switch tube and the fourth switch tube in the H bridge can be realized, such that heating of each switch tube is relative balanced, the service life of the switch tubes in H bridge, therefore, the service life of the vehicle-mounted charger is prolonged.

In the description of the present disclosure, it is understandable that the directions of position relations indicated by the terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial" and "peripheral" are based on the directions or position relations as shown in the drawings, are merely convenient for describing the present disclosure and simplifying the description rather than indicating or implying the fact that devices or elements must have specific directions, or configured or operated in specific directions, and thus cannot understood as a limitation to the present disclosure.

In addition, the terms "first" and "second" merely aim to describe rather than being understood as indication or implication of relative importance or impliedly indicating a number of the indicated technical features. Therefore, the characteristics defined by "first" and "second" can clearly or impliedly comprise at least one such characteristic. In the description of the present disclosure, "more" means at least two, for example, two, three, etc., unless otherwise clearly specifically defined.

In the present disclosure, unless otherwise clearly specified and defined, the terms "mounted", "jointed", "connected", "fixed", etc., should be generalized understood, for example, the "connected" can be fixedly connected, or detachably connected, or integrated, can be mechanically connected or electrically connected, can also be directly connected or connected by an intermediate medium, and can also be internally communicated of two elements, or interacted of two elements, unless otherwise clearly defined. Those ordinary skilled in the art can understand the specific meaning of the terms in the present disclosure according to specific conditions.

In the present disclosure, unless otherwise clearly specified and defined, the case that a first characteristic is "on" or "under" a second characteristic can be the case that the first characteristic and the second characteristic are in direct contact, or in indirect contact by an intermediate medium.

Besides, the case that the first characteristic is "on", "above" and "over" the second characteristic can be the case that the first characteristic is right or obliquely above the second characteristic, or only represents that the horizontal height of the first characteristic is higher than that of the second characteristic. The case that the first characteristic is "under", "below" and "beneath" the second characteristic can be the case that the first characteristic is right or obliquely below the second characteristic, or only represents that the horizontal height of the first characteristic is lower than that of the second characteristic.

In the description of the specification, the description of the reference terms "one embodiment", "some embodiments", "examples", "specific examples" or "some examples" refers to the fact that the specific characteristic, structure, material or feature described in combination with the embodiment or example is contained in the at least one embodiment or example of the present disclosure. In the present specification, and the schematic expression of the above terms unnecessarily aims at the same embodiment or example. In addition, the described specific characteristic, structure, material or feature can be combined in a proper manner in any one or more embodiments or examples. Besides, in the case without mutual contradiction, those skilled in the art can integrate or combine different embodiments or examples or the characteristics of different embodiments or examples described in the present specification.

Although the embodiments of the present disclosure have been shown and described as above, it is understandable that those ordinary skilled in the art can change, modify, substitute and transform the above embodiments in a scope of the present disclosure.

What is claimed is:

1. A method for controlling a vehicle-mounted charger of an electric vehicle, comprising:
   obtaining a first total charging time (TA) for controlling an H bridge in a first manner, a second total charging time (TB) for controlling the H bridge in a second manner, a first total discharging time (TC) for controlling the H bridge in the first manner and a second total discharging time (TD) for controlling the H bridge in the second manner;
   calculating a first total working time ($T_{total1}$) of the H bridge in the first manner according to the first total charging time (TA) and the first total discharging time (TC), and calculating a second total working time ($T_{total2}$) of the H bridge in the second manner according to the second total charging time (TB) and the second total discharging time (TD); and
   selecting a manner for controlling the H bridge according to a relation between the first total working time ($T_{total1}$) and the second total working time ($T_{total2}$) to perform a temperature balanced control over a first switch transistor, a second switch transistor, a third switch transistor and a fourth switch transistor, in the H bridge, if the vehicle-mounted charger charges the power battery, or if the power battery discharges via the vehicle-mounted charger.

2. The method according to claim 1, wherein selecting the manner for controlling the H bridge according to a relation between the first total working time ($T_{total1}$) and the second total working time ($T_{total2}$) to perform the temperature balanced control over the first switch transistor, the second switch transistor, the third switch transistor and the fourth switch transistor if the vehicle-mounted charger charges the power battery, or if the power battery discharges via the vehicle-mounted charger comprises:
   selecting the manner from the first manner and the second manner for controlling the H bridge according to the relation between the first total working time ($T_{total1}$) and the second total working time ($T_{total2}$); and
   controlling the H bridge in the selected manner to perform the temperature balanced control over the first switch transistor, the second switch transistor, the third switch transistor and the fourth switch transistor if the vehicle-mounted charger charges the power battery, or if the power battery discharges via the vehicle-mounted charger.

3. The method according to claim 2, wherein selecting the manner from the first manner and the second manner for controlling the H bridge according to the relation between the first total working time ($T_{total1}$) and the second total working time ($T_{total2}$) comprises:
   selecting the second manner for controlling the H bridge if the first total working time ($T_{total1}$) is larger than the second total working time ($T_{total2}$);
   selecting the first manner for controlling the H bridge if the first total working time ($T_{total1}$) is smaller than the second total working time ($T_{total2}$); and
   selecting the first manner or the second manner for controlling the H bridge if the first total working time ($T_{total1}$) is equal to the second total working time ($T_{total2}$).

4. The method according to claim 3, wherein, if the H bridge is controlled in the first manner,
   when a power grid transient voltage value supplied to the vehicle-mounted charger is larger than 0 or an outwardly discharging transient voltage value of the vehicle-mounted charger is larger than 0, the first switch transistor is controlled to be ON, the second switch transistor is controlled to be OFF, and the third switch transistor and the fourth switch transistor are controlled to be ON and OFF alternately and complementarily; and
   when the power grid transient voltage value supplied to the vehicle-mounted charger is smaller than 0 or the outwardly discharging transient voltage value of the vehicle-mounted charger is smaller than 0, the third switch transistor is controlled to be ON, the fourth switch transistor is controlled to be OFF, and the first switch transistor and the second switch transistor are controlled to be ON and OFF alternately and complementarily.

5. The method according to claim 3, wherein, if the H bridge is controlled in the second manner,
   when a power grid transient voltage value supplied to the vehicle-mounted charger is larger than 0 or an outwardly discharging transient voltage value of the vehicle-mounted charger is larger than 0, the second switch transistor is controlled to be ON, the first switch transistor is controlled to be OFF, and the third switch transistor and the fourth switch transistor are controlled to be ON and OFF alternately and complementarily; and
   when the power grid transient voltage value supplied to the vehicle-mounted charger is smaller than 0 or the outwardly discharging transient voltage value of the vehicle-mounted charger is smaller than 0, the fourth switch transistor is controlled to be ON, the third switch transistor is controlled to be OFF, and the first switch transistor and the second switch transistor are controlled to be ON and OFF alternately and complementarily.

6. A vehicle-mounted charger of an electric vehicle, comprising:
   an H bridge, comprising a first switch transistor, a second switch transistor, a third switch transistor and a fourth switch transistor; and
   a controller, configured to obtain a first total charging time (TA) for controlling the H bridge in a first manner, a second total charging time (TB) for controlling the H bridge in a second manner, a first total discharging time (TC) for controlling the H bridge in the first manner and a second total discharging time (TD) for controlling the H bridge in the second manner; to calculate a first total working time ($T_{total1}$) of the H bridge in the first manner according to the first total charging time (TA) and the first total discharging time (TC) and to calculate a second total working time ($T_{total2}$) of the H bridge in the second manner according to the second total charging time (TB) and the second total discharging time (TD); to select a manner for controlling the H bridge according to a relation between the first total working time ($T_{total1}$) and the second total working time ($T_{total2}$) to perform a temperature balanced control over the first switch transistor, the second switch transistor, the third switch transistor and the fourth switch transistor if the vehicle-mounted charger charges the power battery or if the power battery discharges via the vehicle-mounted charger.

7. The vehicle-mounted charger according to claim 6, wherein the controller is further configured to:
   select the manner from the first manner and the second manner for controlling the H bridge according to the relation between the first total working time ($T_{total1}$) and the second total working time ($T_{total2}$); and
   control the H bridge in the selected manner to perform the temperature balanced control over the first switch transistor, the second switch transistor, the third switch transistor and the fourth switch transistor if the vehicle-mounted charger charges the power battery, or if the power battery discharges via the vehicle-mounted charger.

8. The vehicle-mounted charger according to claim 7, wherein the controller is further configured to:
   select the second manner for controlling the H bridge if the first total working time ($T_{total1}$) is larger than the second total working time ($T_{total2}$);
   select the first manner for controlling the H bridge if the first total working time ($T_{total1}$) is smaller than the second total working time ($T_{total2}$); and
   select the first manner or the second manner for controlling the H bridge if the first total working time ($T_{total1}$) is equal to the second total working time ($T_{total2}$).

9. The vehicle-mounted charger according to claim 8, wherein, if the H bridge is controlled in the first manner, the controller is further configured to:
   control the first switch transistor to be ON, the second switch transistor to be OFF, and the third switch transistor and the fourth switch transistor to be ON and OFF alternately and complementarily when a power grid transient voltage value supplied to the vehicle-mounted charger is larger than 0 or an outwardly discharging transient voltage value of the vehicle-mounted charger is larger than 0; and
   control the third switch transistor to be ON, the fourth switch transistor to be OFF, and the first switch transistor and the second switch transistor to be ON and OFF alternately and complementarily when the power grid transient voltage value supplied to the vehicle-mounted charger is smaller than 0 or the outwardly discharging transient voltage value of the vehicle-mounted charger is smaller than 0.

10. The vehicle-mounted charger according to claim 8, wherein, if the H bridge is controlled in the second manner, the controller is further configured to:
    control the second switch transistor to be ON, the first switch transistor to be OFF, and the third switch transistor and the fourth switch transistor to be ON and OFF alternately and complementarily when a power grid transient voltage value supplied to the vehicle-mounted charger is larger than 0 or an outwardly discharging transient voltage value of the vehicle-mounted charger is larger than 0; and
    control the fourth switch transistor to be ON, the third switch transistor to be OFF, and the first switch transistor and the second switch transistor to be ON and OFF alternately and complementarily when the power grid transient voltage value supplied to the vehicle-mounted charger is smaller than 0 or the outwardly discharging transient voltage value of the vehicle-mounted charger is smaller than 0.

11. The vehicle-mounted charger according to claim 10, wherein the first switch transistor, the second switch transistor, the third switch transistor and the fourth switch transistor are Insulated Gate Bipolar Transistors (IGBTs) or Metal Oxide Semiconductors (MOSes).

12. An electric vehicle, comprising:
    a vehicle-mounted charger, comprising:
      an H bridge, comprising a first switch transistor, a second switch transistor, a third switch transistor and a fourth switch transistor; and
      a controller, configured to obtain a first total charging time (TA) for controlling the H bridge in a first manner, a second total charging time (TB) for controlling the H bridge in a second manner, a first total discharging time (TC) for controlling the H bridge in the first manner and a second total discharging time (TD) for controlling the H bridge in the second manner; to calculate a first total working time ($T_{total1}$) of the H bridge in the first manner according to the first total charging time (TA) and the first total discharging time (TC) and to calculate a second total working time ($T_{total2}$) of the H bridge in the second manner according to the second total charging time (TB) and the second total discharging time (TD); to select a manner for controlling the H bridge according to a relation between the first total working time ($T_{total1}$) and the second total working time ($T_{total2}$) to perform a temperature balanced control over the first switch transistor, the second switch transistor, the third switch transistor and the fourth switch transistor if the vehicle-mounted charger charges the power battery or if the power battery discharges via the vehicle-mounted charger.

13. The electric vehicle according to claim 12, wherein the controller is further configured to:
    select the manner from the first manner and the second manner for controlling the H bridge according to the relation between the first total working time ($T_{total1}$) and the second total working time ($T_{total2}$); and
    control the H bridge in the selected manner to perform the temperature balanced control over the first switch transistor, the second switch transistor, the third switch transistor and the fourth switch transistor if the vehicle-mounted charger charges the power battery, or if the power battery discharges via the vehicle-mounted charger.

14. The electric vehicle according to claim 13, wherein the controller is further configured to:
   select the second manner for controlling the H bridge if the first total working time ($T_{total1}$) is larger than the second total working time ($T_{total2}$);
   select the first manner for controlling the H bridge if the first total working time ($T_{total1}$) is smaller than the second total working time ($T_{total2}$); and
   select the first manner or the second manner for controlling the H bridge if the first total working time ($T_{total1}$) is equal to the second total working time ($T_{total2}$).

\* \* \* \* \*